US005829402A

United States Patent [19]
Takahashi et al.

[11] Patent Number: 5,829,402
[45] Date of Patent: Nov. 3, 1998

[54] INDUCTION SYSTEM FOR ENGINE

[75] Inventors: Masanori Takahashi; Hitoshi Watanabe, both of Hamamatsu, Japan

[73] Assignee: Sanshin Kogyo Kabushiki Kaisha, Hamamatsu, Japan

[21] Appl. No.: 724,519

[22] Filed: Sep. 30, 1996

[30] Foreign Application Priority Data

Sep. 29, 1995 [JP] Japan .................................. 7-253938

[51] Int. Cl.⁶ ............................ B63H 20/00; F02B 61/04
[52] U.S. Cl. ................................ 123/184.24; 123/183.42
[58] Field of Search ........................ 123/184.42, 184.47, 123/514, 58.1, 184.24, 184.25, 184.26, 184.34, 184.35, 184.36, 184.43, 184.44, 184.48, 184.49, 509

[56] References Cited

U.S. PATENT DOCUMENTS

| | | | |
|---|---|---|---|
| 2,891,527 | 6/1959 | Dolza | 123/184.34 |
| 4,416,303 | 11/1983 | Scheurenbrand | 123/514 |
| 4,726,340 | 2/1988 | Hasegawa et al. | 123/184.42 |
| 4,741,295 | 5/1988 | Hosoya et al. | 123/568 |
| 5,063,884 | 11/1991 | Rutschmann et al. | 123/184.42 |
| 5,115,784 | 5/1992 | Mito et al. | 123/514 |
| 5,309,885 | 5/1994 | Rawlings et al. | 123/509 |
| 5,495,830 | 3/1996 | Wu | 123/184.47 |
| 5,513,606 | 5/1996 | Shibata | 123/184.42 |
| 5,630,387 | 5/1997 | Kamiyama | 123/184.42 |

*Primary Examiner*—Marguerite McMahon
*Attorney, Agent, or Firm*—Knobbe, Martens, Olson & Bear LLP

[57] ABSTRACT

An outboard motor having a powerhead with a powerhead with a compact internal combustion engine induction system and fuel supply system. The induction system includes a plenum chamber or surge tank that is formed as a housing on an end of the engine opposite to that where the engine induction passage serving the combustion chamber is formed. This common housing also forms passages for carrying fuel between the supply system and the fuel injector including a vapor separator formed integrally in said, housing.

19 Claims, 5 Drawing Sheets

INDUCTION SYSTEM FOR ENGINE

BACKGROUND OF THE INVENTION

This invention relates to an induction system for an engine and more particularly to an improved induction system for a marine propulsion engine.

The induction system for an internal combustion engine is obviously a very important factor in determining the performance of the engine. Generally, the charging efficiency for the engine can be improved under at least some running conditions by employing a plenum or surge chamber into which atmospheric air is inducted. This plenum chamber then serves the cylinders of the engine through an inlet tracts or runners which extend from the surge chamber to the combustion chamber. By appropriately sizing the volume of the surge chamber and the length and diameter of the runners, the engine may be tuned to provide optimum performance at the desired running conditions.

Where the engine has multiple cylinders, it is not always practical to utilize multiple surge chambers. In addition, by providing a common surge chamber and if all other factors are appropriately designed, some economies of size and can be obtained. This latter factor is particularly important when the engine is employed in a marine propulsion system such as an outboard motor. Obviously, outboard motors provide a significant challenge for engine designers because of their compact nature. In addition to being relatively compact, the engine in an outboard motor is surrounded for the most part by a protective cowling to protect the engine from the water. This further limits however, the ability of the engine to induct air and also further dictates the design of the induction system.

It is, therefore, a principal object to this invention to provide an improved induction system for an internal combustion engine.

It is a further object of this invention to provide an improved induction system for a marine propulsion engine and particularly having multiple cylinders and utilized in the powerhead of an outboard motor.

When a single surge tank is used for a multiple cylinder engine, another design factor is important. This is that the individual induction passages that extend to the individual cylinders should have substantially the same length. At times this length also should be relatively substantial. With the space constraints in outboard motors and other applications having restricted space availability this is an not insignificant problem.

It is, therefore, another principle object of the invention to provide a compact and high efficiency induction system for a multiple cylinder engine.

For a variety of reasons, there is considerable emphasis on applying four-cycle engines for the power plant of an outboard motor to replace the more conventionally employed two-cycle engines. This presents additional problems, particularly in the design of the induction system.

With a four-cycle engine, the air is basically inducted into the crankcase chamber which is at a position spaced from the cylinder head. With four-cycle engines, on the other hand, the induction system feeds the intake charge to the combustion chambers generally through the cylinder head. Because of the other ancillaries associated with the cylinder head, this minimizes the space available in this area for the induction system.

It is, therefore, yet another object of this invention to provide an improved induction system for a four-cycle outboard motor engine.

In the form of both improved power output and also better fuel economy and exhaust emission control, the utilization of fuel injection is considered. Fuel injection permits greater control over the fuel flow and particularly under transient conditions. However, fuel injection systems, particularly as utilized in outboard motors require a number of components which also raise space problems due to the compact nature of outboard motors.

It is, therefore, a still further object of this invention to provide an improved fuel injection system for an outboard motor.

It is a further object of this invention to provide an improved and compact fuel injection and induction system for an outboard motor.

SUMMARY OF THE INVENTION

A first feature of this invention is adapted to be embodied in an internal combustion engine that is comprised of a cylinder block that forms at least one cylinder bore. A cylinder head is affixed at one end of the cylinder block and closes one end of the cylinder bore. A crankcase chamber is formed at the other end of the cylinder block and is closed and formed by a crankcase member that is also fixed relative to the cylinder block. A crankcase is rotatably journaled in the crankcase chamber and is driven by a piston that reciprocates in the cylinder bore. An intake passage is formed in the cylinder head and extends from one side of the cylinder head. An intake pipe extends from the one side of the cylinder head from the intake passage and terminates at a surge tank that is positioned at a side of the crankcase number that is spaced from the cylinder block.

Another feature of the invention is also adapted to be embodied in a multiple cylinder internal combustion engine. The engine is provided with an induction system that includes a surge tank or plenum chamber that feeds the engine cylinders through a plurality of inlet pipes. The inlet pipes enter the surge tank in staggered locations so that their lengths are substantially equal.

Yet another feature of the invention is also adapted to be embodied in an internal combustion engine. The engine is provided with an induction system that includes a surge tank or plenum chamber that feeds the engine cylinders through one or more inlet pipes. A fuel injection system is provided that injects fuel into the combustion chamber or chambers of the engine. The fuel injector is supplied with fuel from a fuel supply system that is formed at least in part integrally in the surge tank.

DETAILED DESCRIPTION OF THE PREFERRED EMBODIMENT OF THE INVENTION

Figure 1:
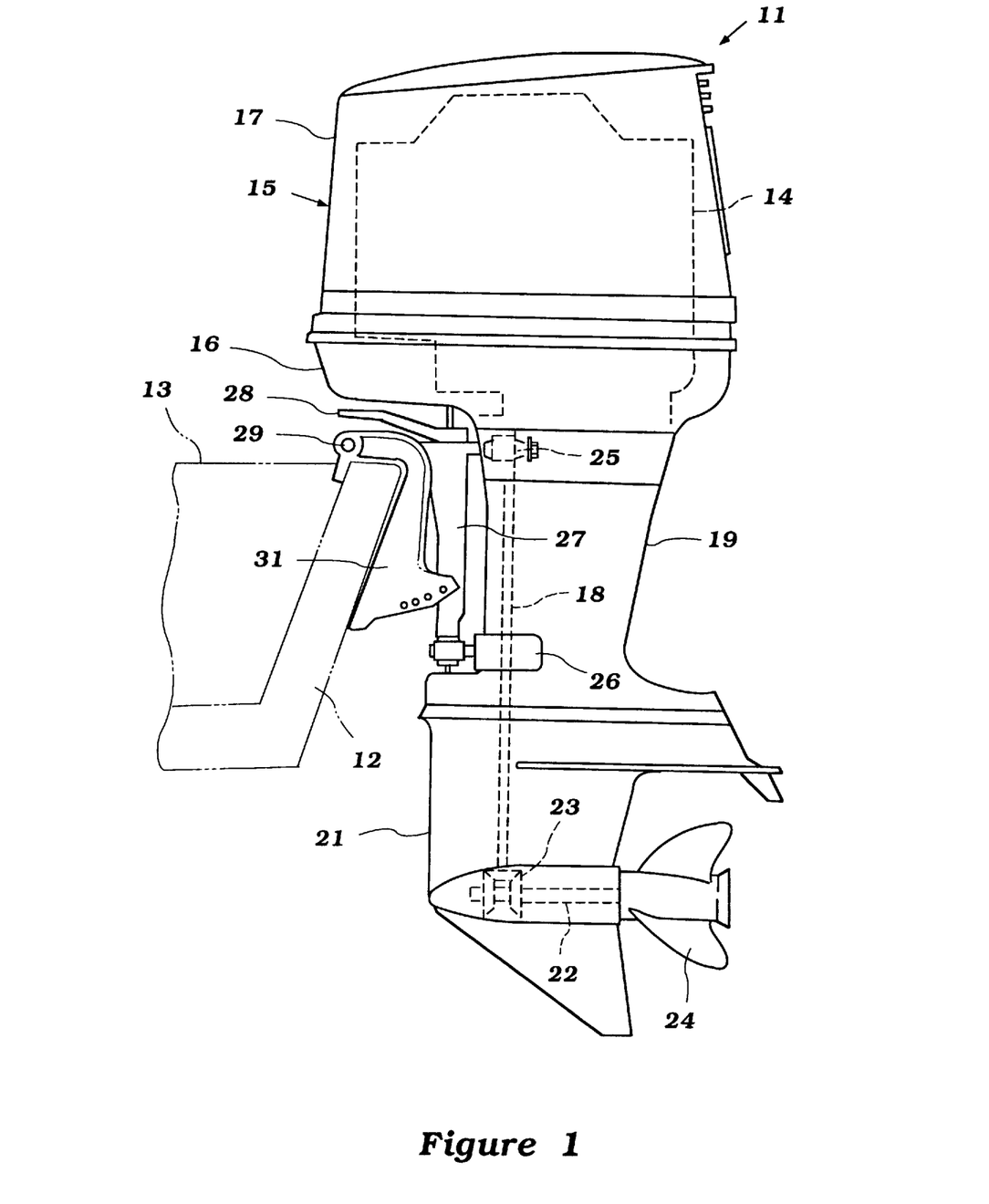
FIG. 1 is a side elevational view of an outboard motor constructed in accordance with an embodiment of the invention.

Referring now in detail to the drawings and initially to FIG. 1, an outboard motor constructed in accordance with an embodiment of the invention is identified generally by the reference numeral 11 and is shown as attached to a transom 12 of a watercraft, indicated generally by the reference numeral 13 and which is shown in phantom. The invention is described in conjunction with an outboard motor such as the outboard 11 because the invention has particularly utility and marine propulsion systems such as outboard motors because of their compact construction and spacial requirements. It will be apparent, however, to those skilled in the art that certain facts of the invention may be utilized with other types of applications for internal combustion engines.

The outboard motor 11 is comprised of a powerhead that consists of powering internal combustion engine 14 and a surrounding protective cowling, indicated generally by the reference numeral 15. This cowling includes a lower tray portion 16 which is formed from a rigid lightweight material such as aluminum or aluminum alloy. An upper main cowling portion 17 is detachably connected to the tray 16 in a known manner. The main cowling portion 17 is preferably formed from an even lighter weight material than the tray 16 such as a molded fiberglass reinforced resin or the like.

As will become apparent by reference to the remaining figures, the engine 14 is mounted in the powerhead so that its output shaft, a crankshaft, rotates about a vertically extending axis, as is typical with outboard motor practice. This is done so as to facilitate connection between the engine output shaft and a drive shaft 18. The drive shaft 18 depends from the powerhead through a drive shaft housing 19 and into a lower unit 21. There the drive shaft 18 drives a propeller shaft 22 through a conventional bevel gear reversing transmission 23. A propeller 24 is affixed to the propeller shaft 22 for propelling the watercraft 13 in a well known manner.

A steering shaft (not shown) is connected by means of an upper bracket assembly 25 and lower bracket assembly 26 to the drive shaft housing 19. This steering shaft is, in turn, journaled within a swivel bracket 27 for steering of the outboard motor 11 about a vertically extending steering axis defined by this steering shaft. A tiller 28 is affixed to the upper end of the steering shaft for steering of the outboard motor 11 in a known manner.

A pivot pin 29 connects the swivel bracket 17 to a clamping bracket 31. The clamping bracket 31 is, in turn, affixed to the watercraft transom 12 in a manner known in the art. Pivotal movement about the pivot pin 29 permits tilt and trim movement of the outboard motor 11 as is well known in this art.

Because the invention deals primarily with engine 14 and the induction and charge forming system for it, further details of the construction of the outboard motor 11 will not be described. Where any component is either not shown or has not been described, reference may be had to any known prior art construction for an appropriate construction that can be utilized to practice the invention.

Referring now in detail primarily to the remaining figures, the construction of the engine 14 will be described in more detail. In the illustrated embodiment, the engine 14 is of the four-cylinder inline type and which operates on a four-cycle principal. Although the number of cylinders employed in the engine may vary and certain features of the invention may be utilized with two-cycle engines, certain features of the invention have particularly utility in conjunction with multi-cylinder four-cycle engines.

The engine 14 is comprised of a cylinder block 32 which is preferably formed from a lightweight material such as aluminum or aluminum alloy in which cylinder bores 33 are formed. In the illustrated embodiment, the cylinder bores 33 are formed by pressed cast or plated thin wall liners although other types of constructions obviously can be employed for forming the cylinder bores 33. The cylinder bores 33 are formed so that their axes extend in a horizontal direction with one being positioned vertically above the other. The cylinder bore axis lie in the common vertical plane.

One end of the cylinder bores 33 is closed by a cylinder head assembly 34 that is detachably connected to the cylinder block 32 at one end thereof. The cylinder head assembly 34 has individual recesses 35 that cooperate with the cylinder bores 33 to form in part the combustion chambers therefore. Although the invention is described in conjunction with an embodiment when the cylinder head assembly 34 is detachable. It will be also understood that the invention can be employed in conjunction with engines having integral cylinder head and cylinder block assemblies.

A crankcase chamber 36 is formed at the end of the cylinder block 32 opposite the cylinder head 34 by a skirt 37 of the cylinder block and a crankcase member 38 that is detachably connected thereto. A crankshaft 39 is rotatably journaled in the crankcase chamber 37 in any known manner.

Pistons 41 reciprocate in each of the cylinder bores 32. Piston pins 42 connect the pistons 41 to the upper or small ends of connecting rods 43. The lower or big ends of the connecting rods 43 are journaled on individual throws 44 of the crankshaft 39 in a well known manner.

A plurality of intake passages 45 are formed in the cylinder head assembly 34 and extend from valve seats 46 which form the intake ports in the cylinder head recess 35. These intake passages 45 terminate in a vertically extending side of the engine 14 and specifically the cylinder head assembly 34. They are served by an induction system, indicated generally by the reference numeral 47 in a manner which will be described later.

Poppet type intake valves 48 are supported in the cylinder head assembly 34 in a known manner. These intake valves 48 are urged to their closed position by coil compression springs 49 acting through keeper retainer assemblies 51 in a known manner.

A plurality of exhaust passages 52 extend from exhaust ports formed by exhaust valve seats 53 in the cylinder head recesses 35. These exhaust passages 52 extend on the side of the engine opposite the intake passages 45. These passages 52 curve downwardly toward the cylinder block 32 so as to meet and discharge into runner sections 54 of an exhaust manifold 55 that is formed integrally within the cylinder block 32. This exhaust manifold 55 extends downwardly to meet with an exhaust system (not shown) formed in the drive shaft housing 19 and lower unit 21 for the discharge of exhaust gases to the atmosphere. Any type of exhaust system known in the art may be employed for this purpose.

The flow through the exhaust passages 52 is controlled by exhaust valves 56 that are slidably supported in the cylinder head assembly 34. Coil compression springs 57 urge these exhaust valves 56 to their closed position through cooperation with keeper retainer assemblies 58 that are affixed to the stems of the valves 56 in a known manner.

The intake and exhaust valves 48 and 56 are opened by means of respective intake and exhaust rocker arm assemblies 59 and 61. These rocker arm assemblies 59 and 61 are journaled on a vertically extending rocker arm shaft 62 that is fixed to the cylinder head assembly 34 in a known manner. A camshaft 63 is journaled in the cylinder head assembly 34 also in a known manner and has individual lobes that cooperate with followers of the rocker arms 59 and 61 for opening the intake and exhaust valves 48 and 56, respectively in a manner known in this art.

Figure 4:
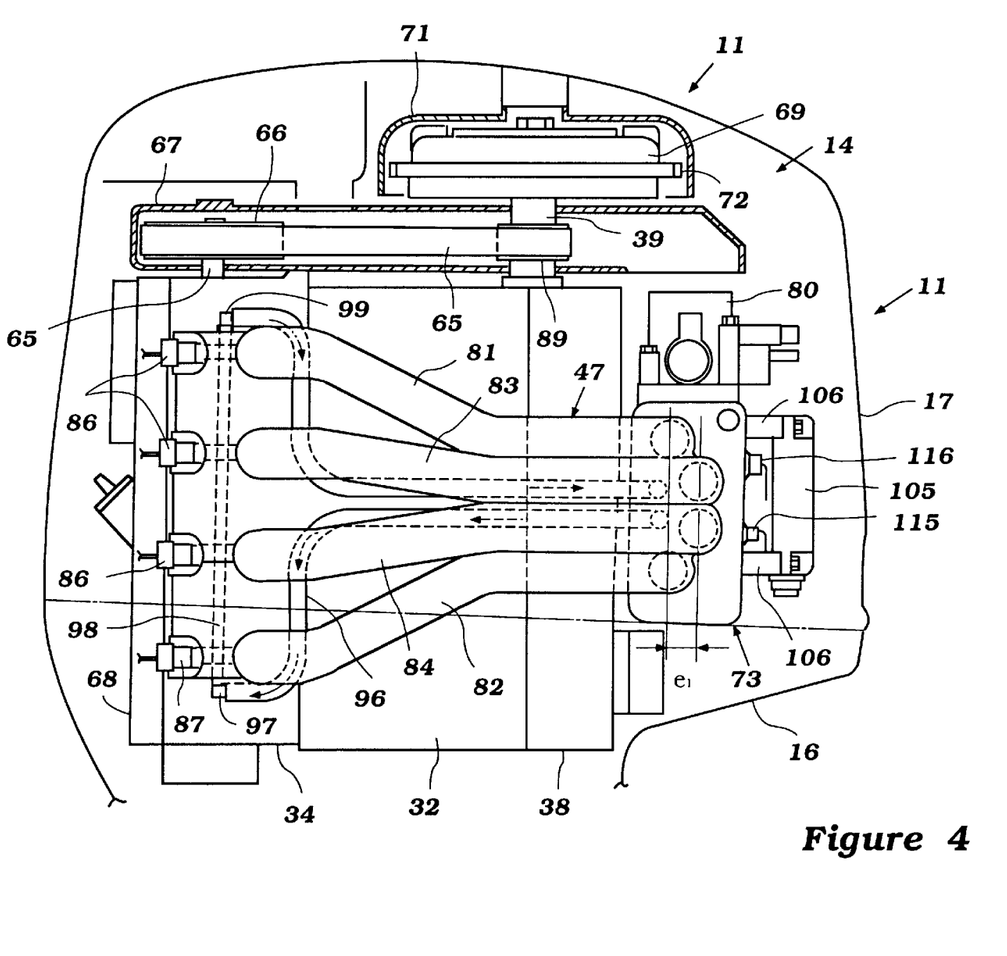
FIG. 4 is a side elevational view of the powerhead looking in the direction opposite to FIG. 2 again showing the protective cowling in outline and portions of the engine broken away and shown in section.

The camshaft 63 is driven by a timing drive at one-half crankshaft speed. This timing drive is shown best in FIGS. 2, 4 and 5 and is comprised of a first or driving sprocket 63 that is affixed to an end of the crankshaft 39 that extends vertically upwardly through the upper end of the cylinder block 32 and crankcase member 38. This sprocket drives a toothed timing belt 64 which, in turn, drives a driven sprocket 65 that is fixed to the camshaft 65 in a known manner. Although a toothed belt drive is depicted and described, it will be readily apparent to those skilled in the art that other types of camshaft drives may be employed.

A timing case cover 67 is affixed to the upper end of the engine and at least partially encloses the timing drive and specifically the belt 65 and sprocket 64 and 66. In a like manner, the camshaft 63 and rocker arm assembly contained at the upper portion of the cylinder head assembly 34 is enclosed by a cam cover 68.

Although they do not appear in the figures, spark plugs are also mounted in the cylinder head assembly 34 for firing the combustible charge delivered to the combustion chambers 35. These spark plugs are fired by an ignition system that includes a flywheel magneto assembly 69 that is affixed to the upper end of the crankshaft 39 above the timing case 67. A flywheel cover 71 is affixed to the engine in an appropriate manner and encloses the flywheel magneto 69. The flywheel magneto 69 is provided with a ring gear 72 that cooperates with a starter motor (not shown) for electric starting of the engine 14.

The induction and charge forming system for the engine 14 will now be described beginning initially with the air induction system. This system appears in FIGS. 2–5. This system includes a combined plenum chamber, vapor separator outer housing assembly, indicated generally by the reference numeral 73. This includes a pair of side housing pieces 74 and 75 that are affixed to each other via an intermediate dividing wall 76 so as to form a plenum chamber volume 77 and a vapor separator volume 78.

This assembly 73 is mounted on the crankcase chamber side of the engine by means of a pair of mounting posts 79 formed either integrally with or detachably connected to the crankcase member 38 with an air space formed there between so as to avoid heat transfer between the crankcase chamber 36 and the housing assembly 73.

Atmospheric air is admitted to the plenum chamber volume 77 through atmospheric inlet 80 in which a throttle valve is positioned. This assembly is affixed to the upper end of the assembly 73.

Either affixed to or forming a portion of the housing 74 are a plurality of runner sections of the induction system 47. These runner sections are comprised of a pair of outer runner sections 81 and 82 that extend to the upper and lower cylinder head intake passages 45. In order to maintain a compact assembly, the sections 81 and 82 are disposed relatively close to each other along the major side of the length of the cylinder block 32 where they then bend outwardly so as to meet up with and join the upper and lower cylinder head intake passages 45.

Figure 5:
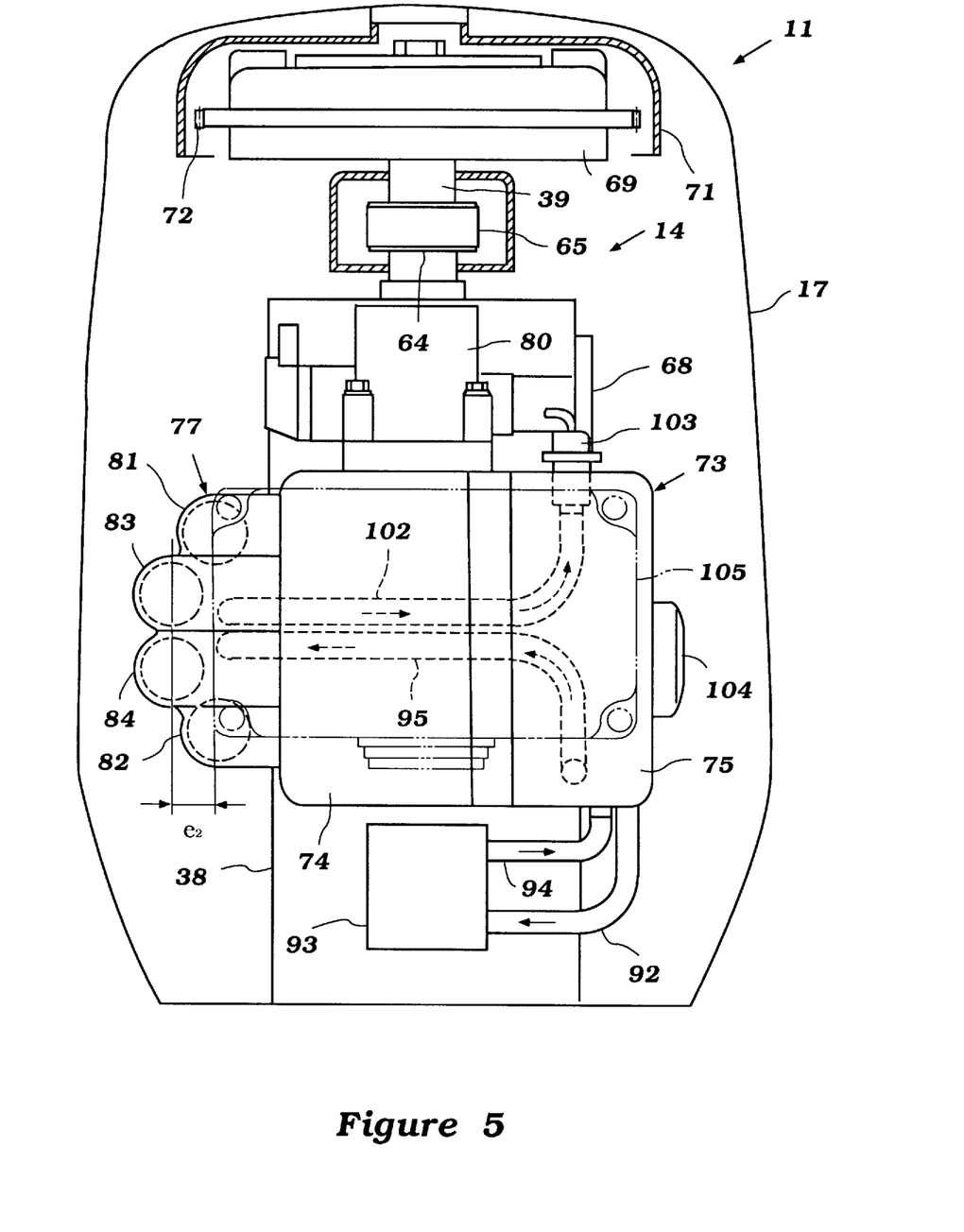
FIG. 5 is a front elevational view of the powerhead again showing the protective cowling only in outline and other portions of the engine broken away and shown in section.

The runners further include a pair of side-by-side inner runners 83 and 84 which are nested between the runners 81 and 82 and serve the no. 2 and 3 cylinders, respectively, counting from top to bottom. It should be seen that these runners 83 and 84 are spaced further in the direction of the cylinder bore axis from the entry of the runners 81 and 82 into the plenum chamber volume 77. This offset is indicated by the dimension $e_1$ in FIG. 4. Also, these runners are disposed transversely outwardly relative to the runners 81 and 82 by a distance $e_2$ as seen in FIG. 5. This is done so that each of the runners 81, 82, 83 and 84 will have substantially the same length while accommodating the difference in their configuration so as to permit them to be configured so as to keep a compact configuration while still maintaining the desired equal length for each runner.

The manifold body formed by the runners 81, 82, 83 and 84 which forms the major portion of the induction system 47 is also formed with a injector receiving body portion, indicated generally by the reference numeral 85 which is disposed adjacent the side where the runners meet the cylinder head inlet passages 45. Fuel injectors 86 are mounted in these portions and are disposed so as to spray fuel through discharge passages 87 formed therein which register with the cylinder head intake passages 45 at their inlet openings. The fuel injectors 86 can be of any known type but preferably are electronically controlled and must have electric solenoids that operate their injectors valve for controlling the timing and duration of fuel spray through the passage 87 into the cylinder head intake passages 45.

The system for supplying fuel to the fuel injectors 86 will now be described and this includes, as has been previously noted, the vapor separator chamber indicated by the reference numeral 78. The fuel supply system for supplying fuel to the fuel injectors 86 includes a number of components mounted on the side of the engine 14 adjacent the fuel vapor separator cavity 78.

These components include a main fuel filter 88 that receives fuel from a remotely positioned fuel pump through a conduit 89. Fuel is drawn through the fuel filter 88 through a pair of conduits 91 and 92 to a low pressure pump 93. The low pressure pump 93 is mounted on the crankcase 38 and may be driven by the crankshaft in any suitable manner. Fuel is then pumped to the vapor separator cavity 78 through a supply conduit 94. This fuel enters the cavity 78 and is maintained at a suitable level by a float-operated valve (not shown).

Mounted within the cavity 78 is a high-pressure electrically driven pump 95 that pressurizes the fuel and then causes the fuel to flow through a conduit 95 which passes through the body 73 and which, in turn, then delivers the fuel to a pressure conduit 96. This conduit 96 terminates at a fitting 97 that delivers the fuel to a delivery passage 98 formed in the body 85. This passage intersects the fuel injectors 86 and supplies fuel to them. A return fitting 99 is provided at the upper end of the body 85 and supplies a return conduit 101 which extends transversely back across a passage 102 formed in the body 73 where it is supplied to a conduit in which a fuel pressure sensor 103 is provided. Fuel pressure is regulated by a pressure regulator which may be a part of the sensor 103 or another element by dumping excess fuel back to the fuel supply system at an appropriate location, for example, to the vapor separator cavity 78.

Figure 2:
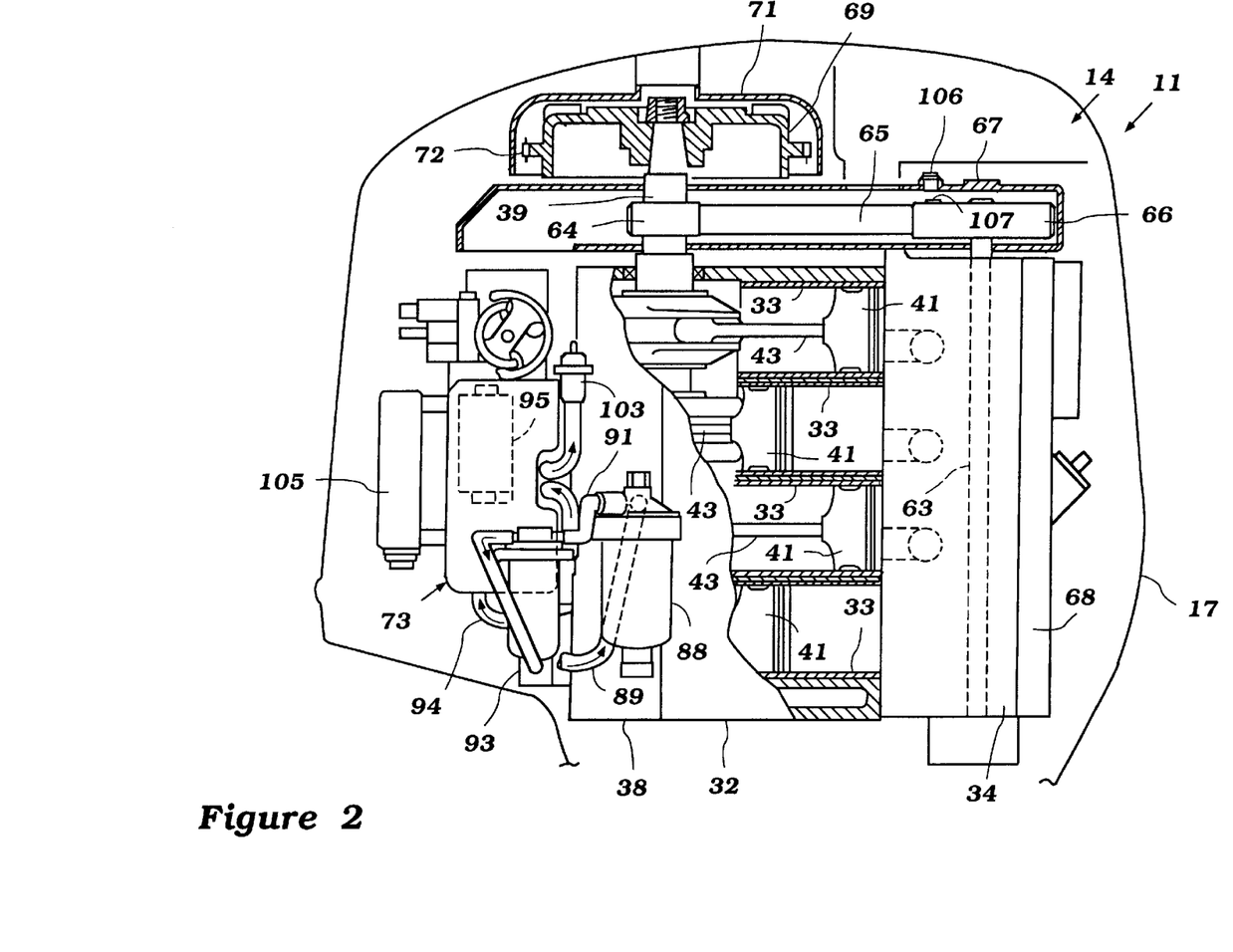
FIG. 2 is an enlarged side elevational view, looking in the same direction as FIG. 1, but showing primarily the powerhead with the protective cowling being shown in outline and portions of the engine broken away so as to more clearly show the construction.

As may be seen in FIG. 2, the conduits 96 and 101 are nested within the area beneath the manifold runners 81, 82, 83 and 84. This protects these conduits and also assists in controlling the fuel temperature. That is, the air flow through the manifold runners 81-84 will cool the fuel.

The upper end of the vapor separator cavity 78 and specifically the wall 76 is provided with a restricted opening 104 that permits the vapor that is accumulated to be mixed with the induction air and delivered to the engine so that it will not be discharged to the atmosphere.

The engine 14 is provided with a lubricating system of any known type and this lubricating system includes an oil filter 104 that is mounted on the side of the engine opposite the induction system 47 so as to facilitate access and servicing.

It has been noted that spark plugs are fired from the magneto generator 69 and also that the fuel injectors 87 are electronically controlled. A number of sensors are incorporated in the engine for outputting signals to an ECU, indicated generally by the reference numeral 105. The ECU 105 is conveniently mounted in a cool location on the plenum chamber housing 74 on a pair of posts 106 so as to provide a cooling air gap there between. Also, the plenum housing 74 insulates the ECU from the high heat of the engine.

As noted a number of sensors are provided for sensing engine conditions and these include a timing sensor 106 (FIG. 2) that is mounted on the belt case 67 in proximity to a magnetic portion 107 or other marker on the camshaft sprocket 66 so as to emanate a pulse signal indicative of the angular position of the camshaft and its number of revolutions in a given time.

Figure 3:
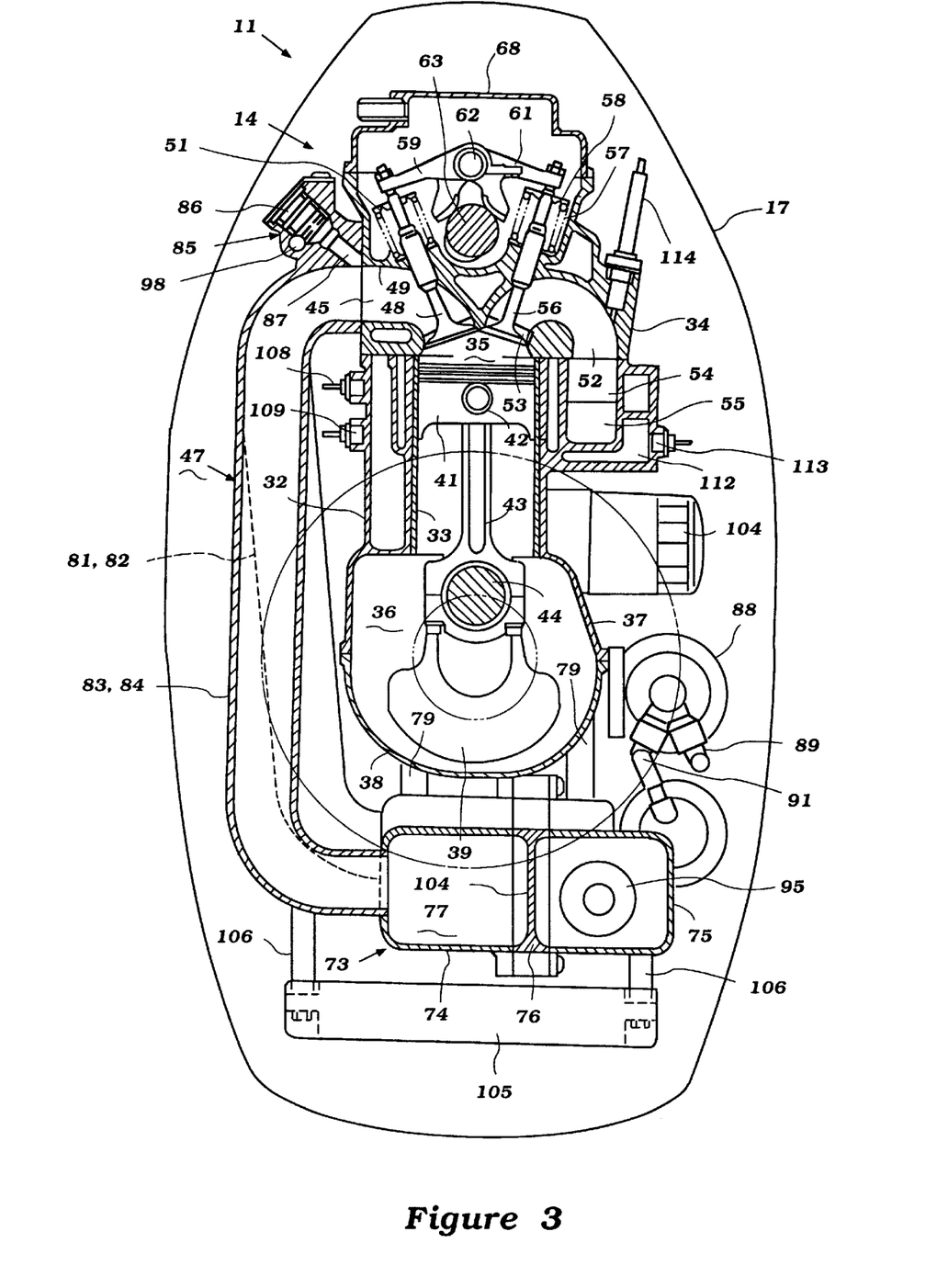
FIG. 3 is a further enlarged top plan view of the portion of the powerhead shown in FIG. 1 again showing the protective cowling in outline and with portions of the engine broken away and shown in section.

There is also provided as seen in FIG. 3 a knock sensor 108 and a cooling jacket temperature sensor 109 that is mounted in proximity to a cooling jacket 111 of the engine. Liquid coolant is circulated through this cooling jacket and through a manifold cooling jacket 112. A sensor 113 senses manifold temperature.

Also provided is an oxygen sensor 114 also shown in FIG. 3 that communicates with one of the exhaust passages 52 so as to provide a signal indicative of the air fuel ratio of the engine, as is well known in this art. There also may be provided an intake air temperature sensor 115 and intake air pressure sensor 116 (FIG. 4) which are both mounted in the plenum chamber portion 77 of the housing 73. Other sensors may also be provided for engine control and those skilled in the art will readily understand where such sensors may be placed.

Thus, from the foregoing description it should be readily apparent that the described construction provides a very compact and effective induction system for an engine which also permits its utilization as a vapor separator for the fuel injection system and its fuel supply circuit. In addition, by passing some of the conduits through the plenum chamber volume the fuel can be cooled or at least prevented from becoming heated. Of course, the foregoing description is that of preferred embodiment of the invention and various changes and modifications may be made without departing from the spirit and scope of the invention, as defined by the appended claims.

What is claimed is:

1. An internal combustion engine comprised of a cylinder block forming at least one cylinder bore, a cylinder head affixed at one end of said cylinder block and closing one end of said cylinder bore, a crankcase chamber formed at the other end of said cylinder block and closed by a crankcase member affixed relative to said cylinder block, said crankcase member having a first surface facing a surface of said cylinder head that faces said cylinder block and an outer surface facing away from said cylinder block, a crankshaft rotatably journaled within said crankcase chamber and driven by a piston reciprocating in said cylinder bore, an intake passage formed in said cylinder head and extending from one side of said cylinder head to said cylinder bore, and an induction system comprised of a surge tank juxtaposed to said outer surface of said crankcase member so that said surge tank is disposed at the opposite end of said cylinder bore from said cylinder head and an intake pipe extending from said surge tank to said cylinder head intake passage.

2. An internal combustion engine as set forth in claim 1, wherein there are a plurality of cylinder bores and intake passages and wherein there is provided a plurality of intake pipes each serving a respective one of said intake passages from said surge tank.

3. An internal combustion engine as set forth in claim 2 wherein the intake pipes have portions that extend in parallel, side-by-side relationship along a substantial portion of the cylinder block.

4. An internal combustion engine as set forth in claim 3, wherein the intake pipes have discharge portions that extend from the parallel, side-by-side portions to the cylinder head intake passages, said discharge portions diverging from each other in the direction toward said cylinder head intake passages, said intake pipes having inlet portions extending from said parallel side-by-side portions to the surge tank which inlet portions enter the surge tank at different locations so as to maintain substantially the same length from said surge tank to said cylinder head intake passages for each of the intake pipes.

5. An internal combustion engine as set forth in claim 1 further including a fuel injector for injecting fuel into the intake passage.

6. An internal combustion engine as set forth in claim 5 further including a fuel supply system for supplying fuel to the fuel injector and including at least one portion of said fuel supply system passing through the surge tank.

7. An internal combustion engine as set forth in claim 6, wherein the fuel supply system includes a vapor separator formed in the surge tank and separated therefrom by an integral wall of the surge tank.

8. An internal combustion engine as set forth in claim 7, wherein there are a plurality of cylinder bores and intake passages and wherein there is provided a plurality of intake pipes each serving a respective one of said intake passages from said surge tank.

9. An internal combustion engine as set forth in claim 8, when the fuel supply system further includes a high-pressure fuel pump contained within the vapor separator.

10. An internal combustion engine as set forth in claim 9, wherein there are additionally formed at least one fuel conduit passing through an exterior wall of the surge tank.

11. An internal combustion engine as set forth in claim 10, further including a return conduit for returning fuel to the vapor separator through an exterior wall of the surge tank.

12. An internal combustion engine as set forth in claim 11, wherein the conduits further have portions that are nested within an area encompassed by the intake pipes.

13. An internal combustion engine as set forth in claim 1, wherein the cylinder is horizontally disposed.

14. An internal combustion engine as set forth in claim 13, wherein the engine is utilized in combination with an outboard motor for driving a propulsion device of said outboard motor and wherein said engine is contained within a powerhead of said outboard motor and is encircled by a protective cowling of said powerhead.

15. An induction system for an a multiple cylinder internal combustion engine having a cylinder block with a plurality of in line cylinders defined cylinder bores having parallel axes, a cylinder head closing one end of said cylinder bores and a crankcase member closing the other end of said cylinder bores, said induction system including a surge tank disposed along one side of said cylinder block at a distance from said cylinder head in the direction of said cylinder bore axes such that said surge tank is closer to said crankcase member than said cylinder head, said surge tank feeding the engine cylinders through a plurality of inlet pipes that extend along said one side of said cylinder block, said inlet pipes having intermediate portions extending in parallel side by side relation to each other and to said cylinder bore axes, discharge portions that extend from one end of the parallel side by side intermediate portions to the engine cylinders and which diverge from each other, and inlet portions extending from the other ends of said parallel side by side intermediate portions and entering said surge tank in staggered locations in the direction of said cylinder bore axes so that the lengths of said inlet pipes are substantially equal.

16. An induction system as set forth in claim 15, wherein the intake pipes communicate with the combustion chambers through intake ports formed in a cylinder head of the engine.

17. An induction system as set forth in claim 16, wherein the intake ports are all spaced the same distance from the surge tank.

18. An induction system as set forth in claim 17, wherein the inlet pipes enter the surge tank at different locations so as to maintain substantially the same length for each of the inlet pipes.

19. An induction system as set forth in claim 18, wherein the inlet pipes entry into the surge tank lie at different distances from the intake ports.

* * * * *

UNITED STATES PATENT AND TRADEMARK OFFICE
CERTIFICATE OF CORRECTION

PATENT NO. : 5,829,402
DATED : November 3, 1998
INVENTOR(S) : M. Takahashi et al.

Page 1 of 1

It is certified that error appears in the above-identified patent and that said Letters Patent is hereby corrected as shown below:

Column 9,
Line 3, "defined cylinder" should be changed to -- defined by cylinder --

Signed and Sealed this

Eighteenth Day of December, 2001

Attest:

JAMES E. ROGAN
Attesting Officer       Director of the United States Patent and Trademark Office